J. BECKER.
VARIABLE SPEED MECHANISM.
APPLICATION FILED AUG. 22, 1912.

1,115,487.

Patented Nov. 3, 1914.
3 SHEETS—SHEET 1.

Witnesses:
Carl L. Choate.
Adolph C. Kaiser.

Inventor:
John Becker.

J. BECKER.
VARIABLE SPEED MECHANISM.
APPLICATION FILED AUG. 22, 1912.

1,115,487.

Patented Nov. 3, 1914.
3 SHEETS—SHEET 2.

Witnesses:
Carl L. Shoote
Adolph C Kaise

Inventor:
John Becker:
by Emery, Booth, Janney & Varney
Attys

J. BECKER.
VARIABLE SPEED MECHANISM.
APPLICATION FILED AUG. 22, 1912.
1,115,487.
Patented Nov. 3, 1914.
3 SHEETS—SHEET 3.
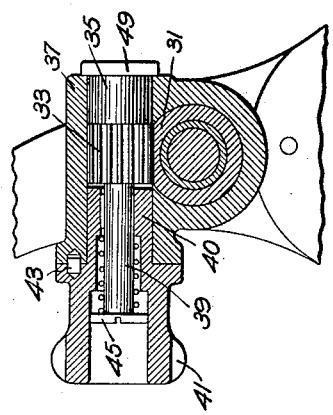
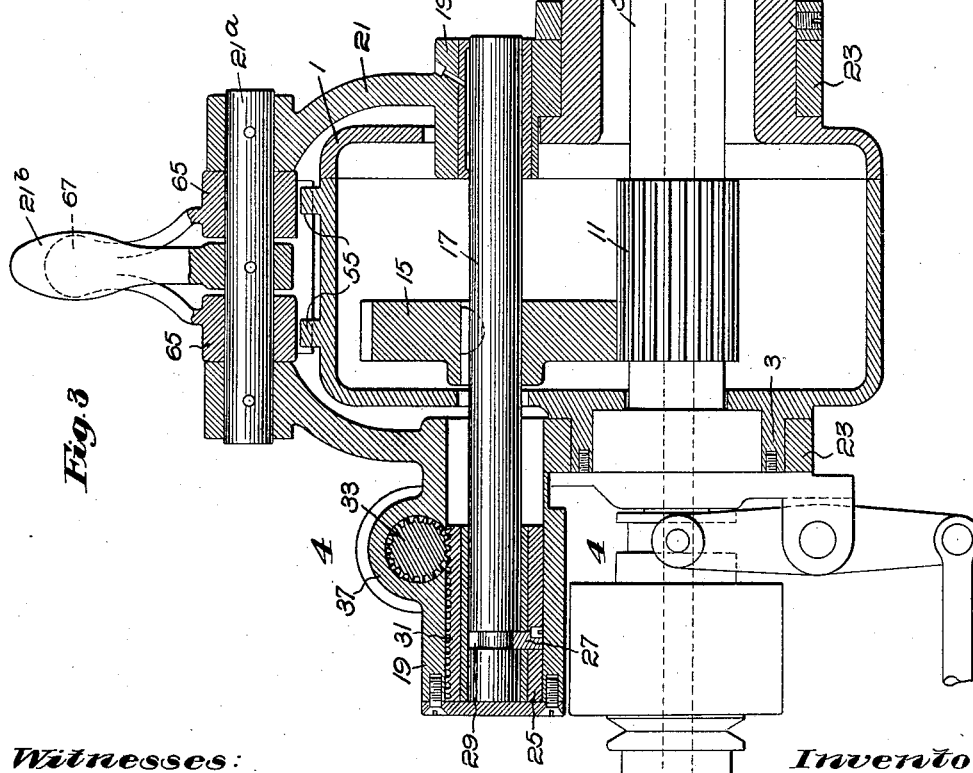
Witnesses:
Carl L. Choate
Adolph C. Kaiser
Inventor:
John Becker
by Emery, Booth, Janney & Varney,
Attys

UNITED STATES PATENT OFFICE.

JOHN BECKER, OF HYDE PARK, MASSACHUSETTS.

VARIABLE-SPEED MECHANISM.

1,115,487.                    Specification of Letters Patent.          Patented Nov. 3, 1914.

Application filed August 22, 1912. Serial No. 716,380.

*To all whom it may concern:*

Be it known that I, JOHN BECKER, a citizen of the United States, and a resident of Hyde Park, in the county of Norfolk and Commonwealth of Massachusetts, have invented an Improvement in Variable-Speed Mechanism, of which the following description, in connection with the accompanying drawings, is a specification, like characters on the drawings representing like parts.

This invention relates to improvements in variable speed gears of the general character disclosed in Letters Patent No. 1,050,792, granted to me on January 21, 1913.

Among other objects, the invention provides means for readily shifting the gears and securely holding them in various positions of adjustment.

Figure 1:
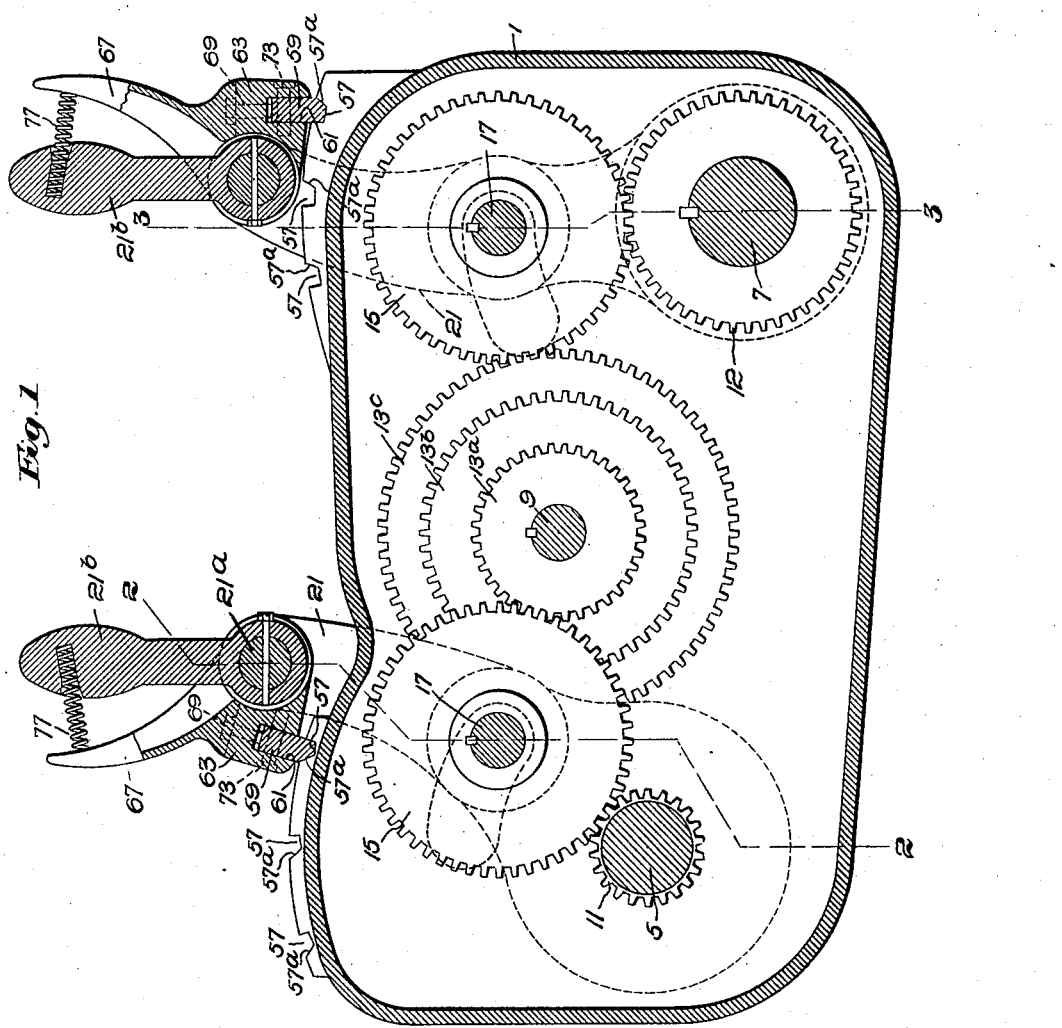
Figure 2:
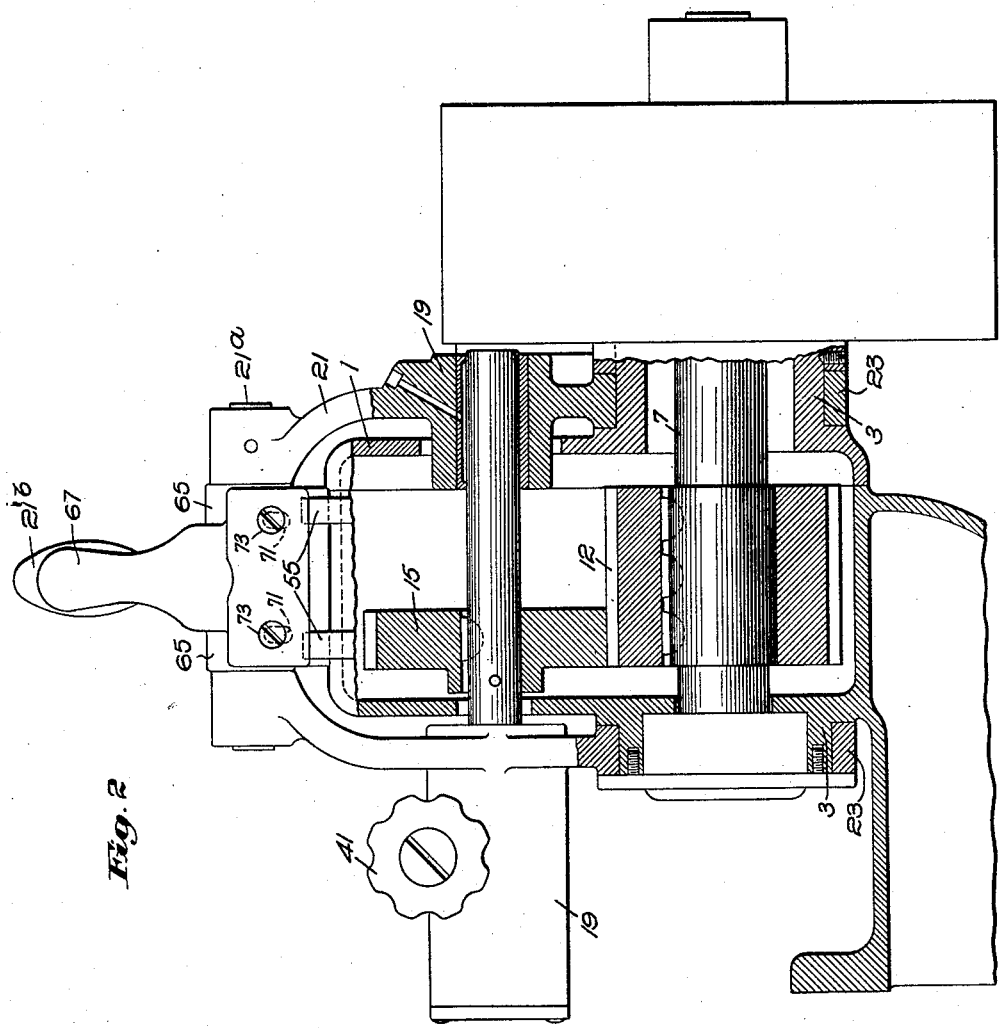

The character of the invention may be best understood by reference to the following description of an illustrative embodiment thereof shown in the accompanying drawing, wherein:

Figure 1 is a vertical section through an illustrative variable speed mechanism embodying the invention; Fig. 2 is a view partly in elevation and partly in section taken on line 2—2 of Fig. 1; Fig. 3 is a view partly in elevation and partly in section taken on line 3—3 of Fig. 1; and Fig. 4 is a detail to be referred to.

Referring to the drawings, the illustrative mechanism there shown as embodying the invention comprises a casing 1 having bosses 3 forming bearings for a driving shaft 5 (Fig. 1), a driven shaft 7 and an intermediate shaft 9. The driving shaft has a wide pinion 11 (Fig. 3) fast thereon; the driven shaft has a larger wide pinion 12 (Fig. 2) fast thereon, and the intermediate shaft has different sized gears $13^a$, $13^b$, $13^c$ fast thereon. While three intermediate gears are shown herein for illustrative purposes, any number may be used as desired. To transmit rotation from one of said wide pinions to the intermediate gears, and from the latter to the other wide pinion, tumbler gears 15 are provided fast on shafts 17 journaled in boss bearings 19 in pairs of rock carriers 21 exterior of the casing and terminating in fulcra rings 23 encircling the boss bearings of the driving and driven shafts 5 and 7. The carriers of each pair are connected to move together by a pin $21^a$ fast in ears in the upper ends of said carriers, said pin being provided with a handle $21^b$ fast thereon for a purpose to be described. To change the speed it is necessary to shift the tumbler gears axially and also toward or from the intermediate gears. To shift the tumbler gears axially, each is mounted fast on its shaft and one of its boss bearings is of sufficient length to receive a bearing sleeve 25 (Fig. 3) moved longitudinally with said shaft by a pin 27 projecting internally from said sleeve into an annular groove 29 in said shaft. To slide the shaft and sleeve the latter has a rack 31 slid longitudinally by a pinion 33 (Fig. 4) having a smooth extension 35 journaled in a boss 37 transverse to the elongated boss bearing referred to. To turn said pinion it is provided with a stem 39 received by and splined to a sleeve 40 terminating in a handle 41 normally locked against rotation by a dowel pin 43 projecting from a shoulder of said handle into a lock socket in the end of the pinion receiving sleeve 37. To hold this dowel pin normally in its socket there is provided a helical spring 45 encircling said stem and confined between a head 47 on said stem and the end of a counter-bore in said handle. To limit axial movement of the rack actuating pinion under the action of this spring, its smooth extension terminates in a head 49 engaging the end of the sleeve opposite said handle. By the above described construction, to shift the tumbler gear axially it is merely necessary, first, to pull the handle 41 axially until the lock dowel pin 43 is released from its socket, and then turn the handle to rotate the pinion sufficiently to slide its rack and the shaft 17 to bring the tumbler gear opposite the desired intermediate gear. In the illustrative device shown herein, one complete turn of the handle will move the tumbler gear out of line with one gear into line with the next adjacent gear. On the completion of this turn the locking dowel pin will return into registration with its socket, and on release of the handle, the spring 47 will set said pin in its socket and securely lock the pinion and the tumbler gear against inadvertent axial movement.

Having described the means for adjusting the tumbler gears axially, I will next describe the means for securing the rock carriers 21, referred to, at various distances from the intermediate shaft in order to hold the tumbler gears into mesh with any one of the different sized gears. When a tumbler gear is adjusted to one of its extreme positions near the walls of the casing, there is more work brought to bear upon one of the boss bearings of the tumbler shaft than on the other and hence a tendency for the shaft to be thrown out of true alinement. If, however, the carrier is locked adjacent the extreme limits of adjustment of the tumbler gear axially of its shaft, any rocking of one of the tumbler shaft carriers more than the other is prevented and said shaft is always held parallel to the intermediate gear shaft. To this end the top of the casing is provided with spaced ribs 55 (Fig. 3) each provided with a series of stops or notches 57 (Fig. 1) corresponding to the different positions of adjustment of the tumbler gears.

In the illustrative device three different sized gears are shown and accordingly each of said ribs is provided with three notches. Coöperating with these notches is a blade or member 59 of sufficient length for one of its ends to engage a notch in one of the ribs while its opposite end engages a corresponding notch in the opposite rib, as shown in Figs. 2 and 3. The blade is set in a recess 61 in a rock arm 63 having forked ends terminating in bosses 65 journaled on the pin 21$^a$ referred to, and straddling the carrier operating handle 21$^b$. To control this rock arm it is provided with a handle 67 preferably integral therewith and projecting upwardly along the carrier handle in position to permit the two to be simultaneously grasped to rock the blade 59 into and out of the rib notches 57.

To prevent the blade from accidentally working up out of its notches under the jarring and vibration which of necessity occurs in mechanisms of the character described herein, the thrust receiving walls of the notches are curved or concaved to provide seats 57$^a$, the curve of each of which is on an arc struck about the axis of the handle pin 21$^a$ as a center and an edge of the blade is curved to correspond with the curvature of these seats. As a result the blade may accurately seat in said seats and may be rocked in and out of the same without undue wear or mutilation thereof.

To take up any wear or back lash between the gears and enable the most perfect meshing thereof, provision is made for varying the different positions of adjustment of the carrier. To this end set screws 69 (Fig. 1) are provided which bear against the rear edge of the blade 59 and enable the latter to be projected more or less from the recess which receives it. This will rock the carrier and its tumbler gear toward or from the intermediate different sized gears and permit the accurate intermeshing engagement thereof.

To hold the blade securely in its positions of adjustment in its recess it is provided with elongated slots 71 receiving clamp screws 73 entered through a wall 75 of the recess, the latter having sufficient spring under the action of the clamp screws to securely grip the blade and hold the same in place.

It will be observed that the point of engagement of the blade 59 with its seats is between the fulcrum of its arm on the carrier pin 21$^a$ and the fulcrum of the carrier on the casing. The carrier, in holding the tumbler gear up to its intermediate gear, tends to react and rock away therefrom. As a result the blade arm is rocked and presses and maintains the blade down into the notch seats. To further insure the blade against accidental displacement from the rib notch seats a spring 77 may be interposed between the carrier handle 21$^b$ and the blade handle 67, although this is not indispensable.

By my invention there is provided a simple and effective means for securely adjusting the tumbler gears to and retaining the same in their proper positions of adjustment.

While tumbler gears are shown herein on opposite sides of the different sized gears, it will be understood that in some instances a single tumbler gear may be used on one side of said gears if desired.

Having described one embodiment of the invention without limiting the same thereto, what I claim as new and desire to secure by Letters Patent is:

1. In a variable speed mechanism, the combination of different sized gears, a shaft, a tumbler gear fast thereon, rack and pinion means for shifting the latter axially, and a spring pressed handle connected to said pinion and having provision permitting the same to be rotated after a preliminary axial movement thereof.

2. In a variable speed mechanism, the combination of different sized gears, a tumbler gear, a carrier therefor movable toward and from said different sized gears, a casing having spaced rows of notches thereon, and an elongated blade for simultaneous engagement with pairs of said notches to resist movement of said tumbler gear out of true alining mesh with said different sized gears.

3. In a variable speed mechanism, the combination of different sized gears, a tumbler gear, a shaft therefor, a carrier for said shaft movable toward or from said different sized gears, fixed means and carrier locking means for application to said fixed means at spaced points along the same in the direction of the length of said shaft for resisting movement of said shaft out of true alinement.

4. In a variable speed mechanism, the combination of different sized gear, a tumbler gear, a shaft therefor, a carrier for said shaft movable toward and from said different sized gears, and means for securing said gear in different positions of adjustment including an elongated blade, and means engaging the same at different points to prevent movement of said shaft out of true alinement.

5. In a variable speed mechanism, the combination of a casing, different sized gears, a tumbler gear, a shaft for the latter, a carrier for said shaft fulcrumed on said casing and adjustable toward and from said different sized gears, and means to secure said carrier in different positions of adjustment including spaced notched ribs on said casing and a blade on said carrier for engagement with notches in both of said ribs to resist movement of said shaft out of alinement.

6. In a variable speed mechanism, the combination of a casing, different sized gears, a tumbler gear, a shaft therefor having ends projecting beyond said casing, a carrier fulcrumed on the latter and having bearings receiving said shaft, and means opposite the outer intermediate gears for locking said carrier to said casing in different positions of adjustment relative to said intermediate gears.

7. In a variable speed mechanism, the combination of different sized gears, a tumbler gear, a shaft therefor, a carrier for said shaft adjustable toward and from said intermediate gears, and means for locking said carrier in different positions of adjustment comprising a long blade fulcrumed to said carrier and stop means engaged by the ends of said blade.

8. In a variable speed mechanism, the combination of different sized gears, a tumbler gear movable toward and from the same, a shaft for said tumbler gear, a carrier for said shaft, a locking blade fulcrumed to said carrier, and means having curved seats engaged by a correspondingly curved edge of said blade for preventing accidental displacement of said blade.

9. In a variable speed mechanism, the combination of different sized gears, a tumbler gear and its shaft, a rocking carrier for the latter and means for locking the same in different positions of adjustment comprising means fulcrumed on said carrier, and fixed means engaged thereby, said fulcrumed means having provision for engagement with said fixed means at a point between its connection with said carrier and the fulcrum of said carrier, said point being on the side of the latter opposite from said different sized gears whereby said fulcrumed means automatically is seated against said fixed means in resisting movement of the tumbler gear from said different sized gears.

10. In a variable speed mechanism, the combination of different sized gears, a tumbler gear and its shaft, a rocking carrier for said shaft, and means for locking said carrier in different positions of adjustment comprising a stop, and rocking means fulcrumed on said carrier for engagement with said stop at a point between the fulcra of said carrier and rocking means.

11. In a variable speed mechanism, the combination of a plurality of different sized gears, a tumbler gear and its shaft, a carrier for said shaft, and means for holding said carrier in different positions of adjustment relatively to said different sized gears and including a plurality of stops, and means on said carrier for engagement with said stops and having a pivoted connection to said carrier with provision for automatically urging said stop engaging means against one or another of said stops in resisting the driving thrust between said tumbler gear and different sized gears.

12. In a variable speed mechanism, the combination of different sized gears, a tumbler gear and its shaft, a movable carrier for said shaft and means for locking said carrier in different positions of adjustment including a plurality of stops, and rocking means fulcrumed on said carrier and having provision for engagement with any of said stops at a point intermediate the fulcra of said rocking means and carrier, said point being on the side of the latter opposite from said different sized gears.

13. In a variable speed mechanism, the combination of different sized gears, a tumbler gear, a rocking carrier therefor and means for holding the latter in different positions of adjustment including stops, and means carried by said carrier for engagement with one or another of said stops at a point between its point of connection with said carrier and the fulcrum of said carrier, said point being on the side of the latter opposite from the different sized gears.

14. In a variable speed mechanism, the combination of different sized gears, a tumbler gear and its shaft, a rocking carrier therefor adjustable toward and from said different sized gears, and means for locking said carrier in its different positions of adjustment comprising a stop, a rock arm fulcrumed to said carrier and a blade carried by said arm and engaging said stop at a point intermediate the fulcra of said rock arm and carrier.

15. In a variable speed mechanism, the combination of a casing, different sized gears, a tumbler gear and its shaft, a carrier for said tumbler gear adjustable toward and from said different sized gears, said casing having spaced ribs provided with curved lock seats, and an arm fulcrumed to said carrier and having means curved to conform to said seats.

16. In a variable speed mechanism, the combination of a casing, different sized gears, a tumbler gear and its shaft, a carrier for said shaft adjustable relatively to said intermediate gears, and means for securing said carrier in different positions of adjustment comprising notched ribs, a rock arm fulcrumed to said carrier and having a blade for engagement with the notches of said ribs and a handle for controlling said blade.

17. In a variable speed mechanism, the combination of a casing, different sized gears, a tumbler gear and its shaft, a carrier for said shaft adjustable relatively to said intermediate gears, and means for securing said carrier in different positions of adjustment comprising notched ribs, a rock arm fulcrumed to said carrier and having a blade for engagement with the notches of said ribs and a spring pressed handle for said blade.

18. In a variable speed mechanism, the combination of a casing, different sized gears, a tumbler gear and its shaft, a carrier, a handle for swinging the latter toward and from said intermediate gears, and means for locking said carrier in different positions of adjustment comprising stops on said casing determining said positions, means carrying a blade for engagement with said stops and a handle for controlling said blade carrying means.

19. In a variable speed mechanism, the combination of different sized gears, a tumbler gear, a shaft, a carrier having widely spaced bearings receiving said shaft, and means for locking said carrier at widely spaced points in different positions of adjustment relatively to said different sized gears.

20. In a variable speed mechanism, the combination of different sized gears, a tumbler gear and its shaft, a carrier adjustable toward and from said different sized gears, and means for locking said carrier in its different positions of adjustment including means for varying the meshing engagement of the gears.

21. In a variable speed mechanism, the combination of different sized gears, a tumbler gear and its shaft, a carrier adjustable toward and from said different sized gears, and means for locking said carrier in its different positions of adjustment comprising fixed means having stops corresponding to the different positions of adjustment of said carrier, and means for adjusting said carrier relatively to said stops.

22. In a variable speed mechanism, the combination of different sized gears, a tumbler gear and its shaft, a carrier therefor adjustable toward and from said different sized gears, and means for locking said carrier in its different positions of adjustment and having provision for varying said positions to permit the adjustment of the gears into proper meshing relation.

23. In a variable speed mechanism, the combination of different sized gears, a tumbler gear and its shaft, a carrier therefor adjustable toward and from said different sized gears, and means for locking said carrier in its different positions of adjustment comprising a rock arm fulcrumed to said carrier, and a blade adjustable relatively to said rock arm.

24. In a variable speed mechanism, the combination of different sized gears, a tumbler gear and its shaft, a carrier adjustable toward and from said different sized gears, and means for locking said carrier in its different positions of adjustment comprising a rock arm, a blade adjustably mounted in said arm, means to secure said blade in its positions of adjustment in said arm and stops engaged by said blade.

25. In a variable speed mechanism, the combination of different sized gears, a shaft, a tumbler gear fast thereon, a carrier for said shaft adjustable toward or from said different sized gears, a non-rotatable sleeve movable axially with said shaft, a rack on said sleeve, a pinion meshing with said rack, means for turning said pinion, and means for locking the latter against rotation.

In testimony whereof, I have signed my name to this specification, in the presence of two subscribing witnesses.

JOHN BECKER.

Witnesses:
ARTHUR E. CARSON,
EVERETT S. EMERY.

---

Copies of this patent may be obtained for five cents each, by addressing the "Commissioner of Patents, Washington, D. C."